March 12, 1940.  J. V. FARWELL, 3D., ET AL  2,193,167
WEIGHING SCALE
Filed Oct. 22, 1937   5 Sheets-Sheet 1

Inventors:
John V. Farwell III
Floyd A. Ray
By: Cox & Moore attys.

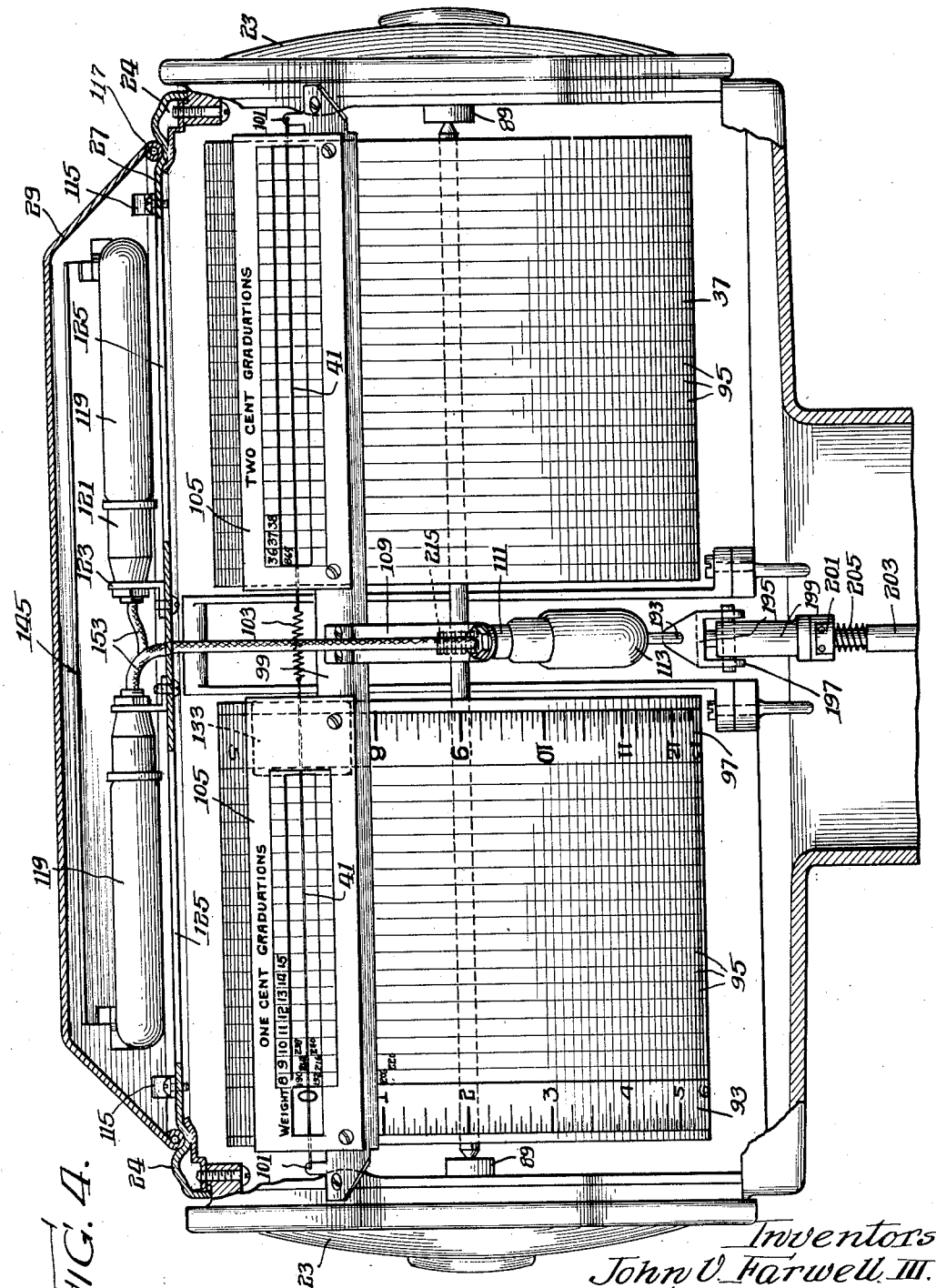

March 12, 1940. J. V. FARWELL, 3D., ET AL 2,193,167
WEIGHING SCALE
Filed Oct. 22, 1937 5 Sheets-Sheet 3
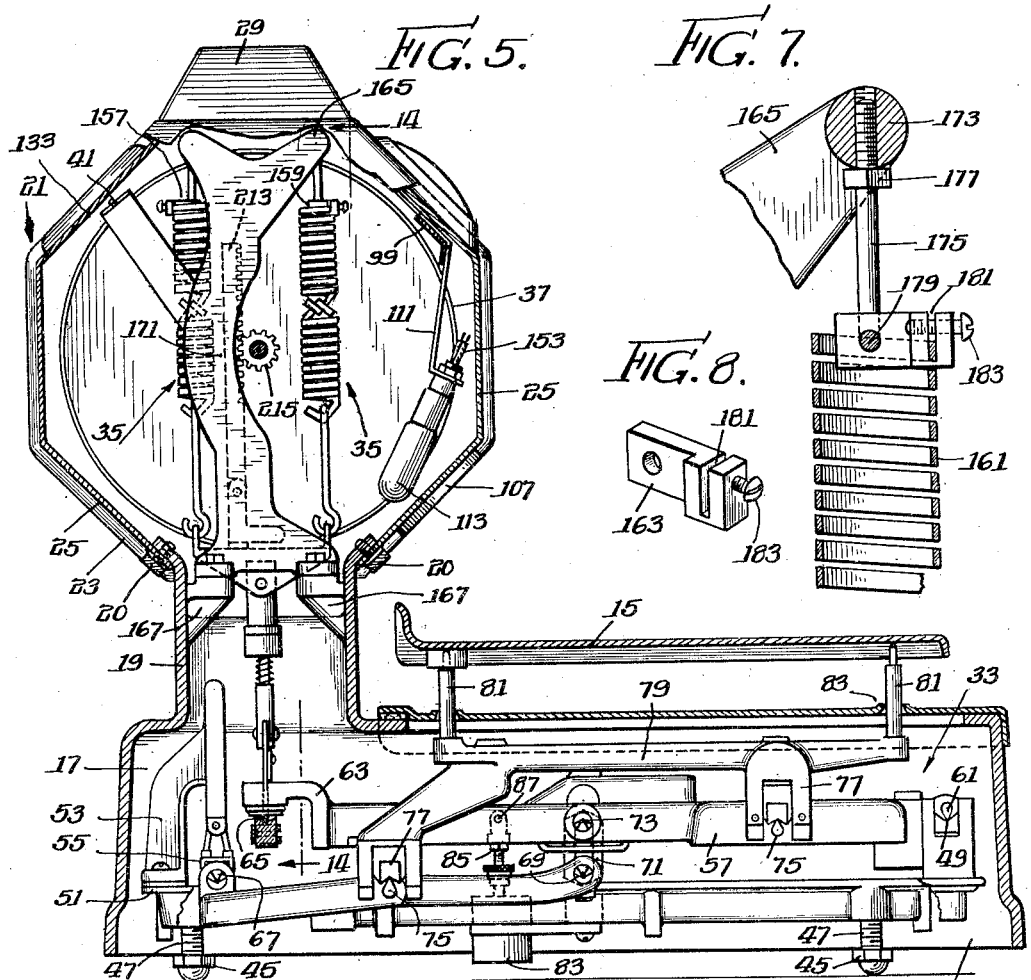
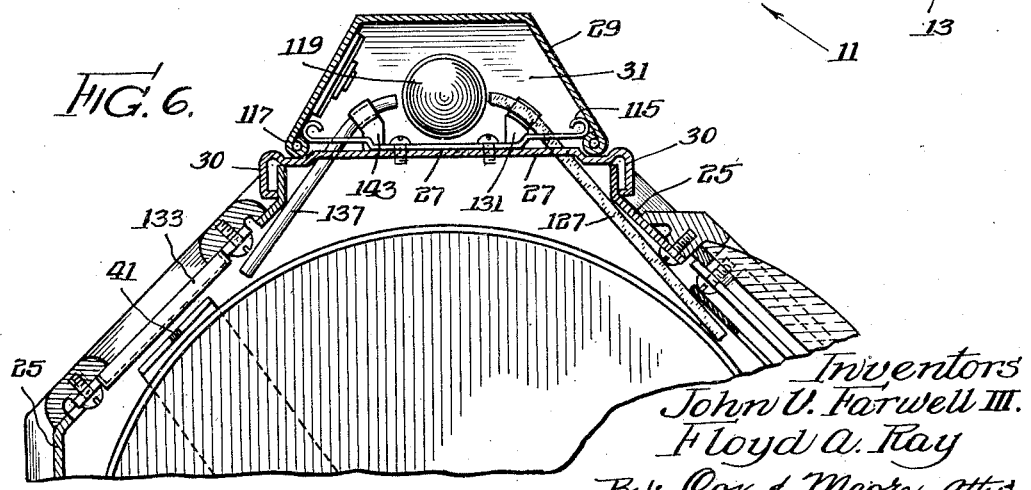
Inventors
John V. Farwell III.
Floyd A. Ray
By:- Cox & Moore attys.

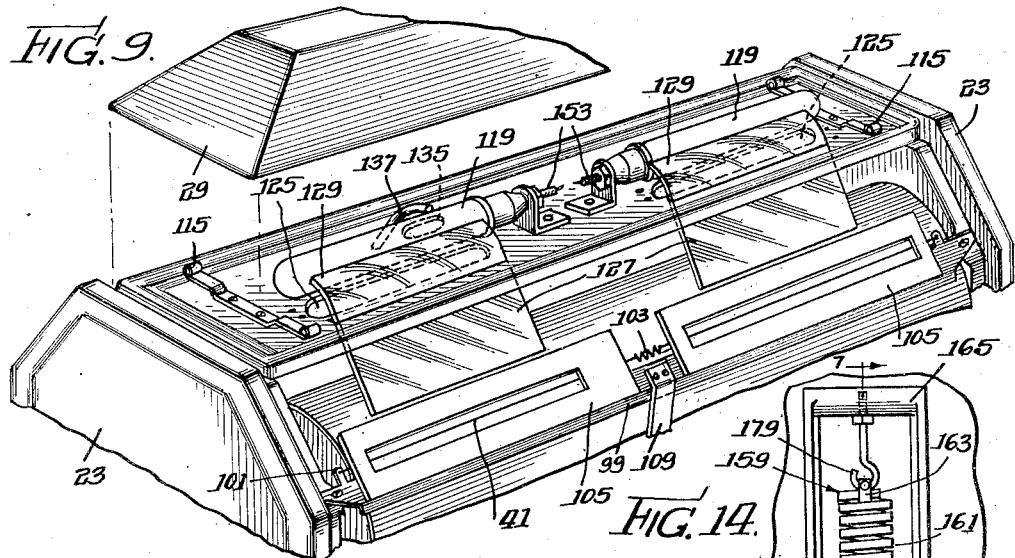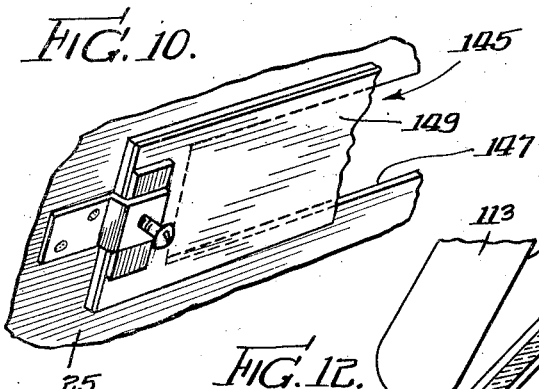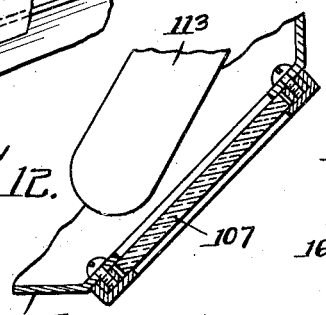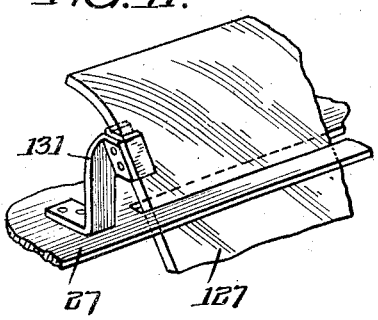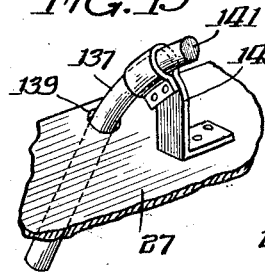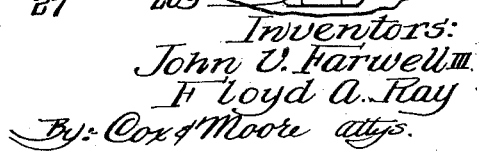

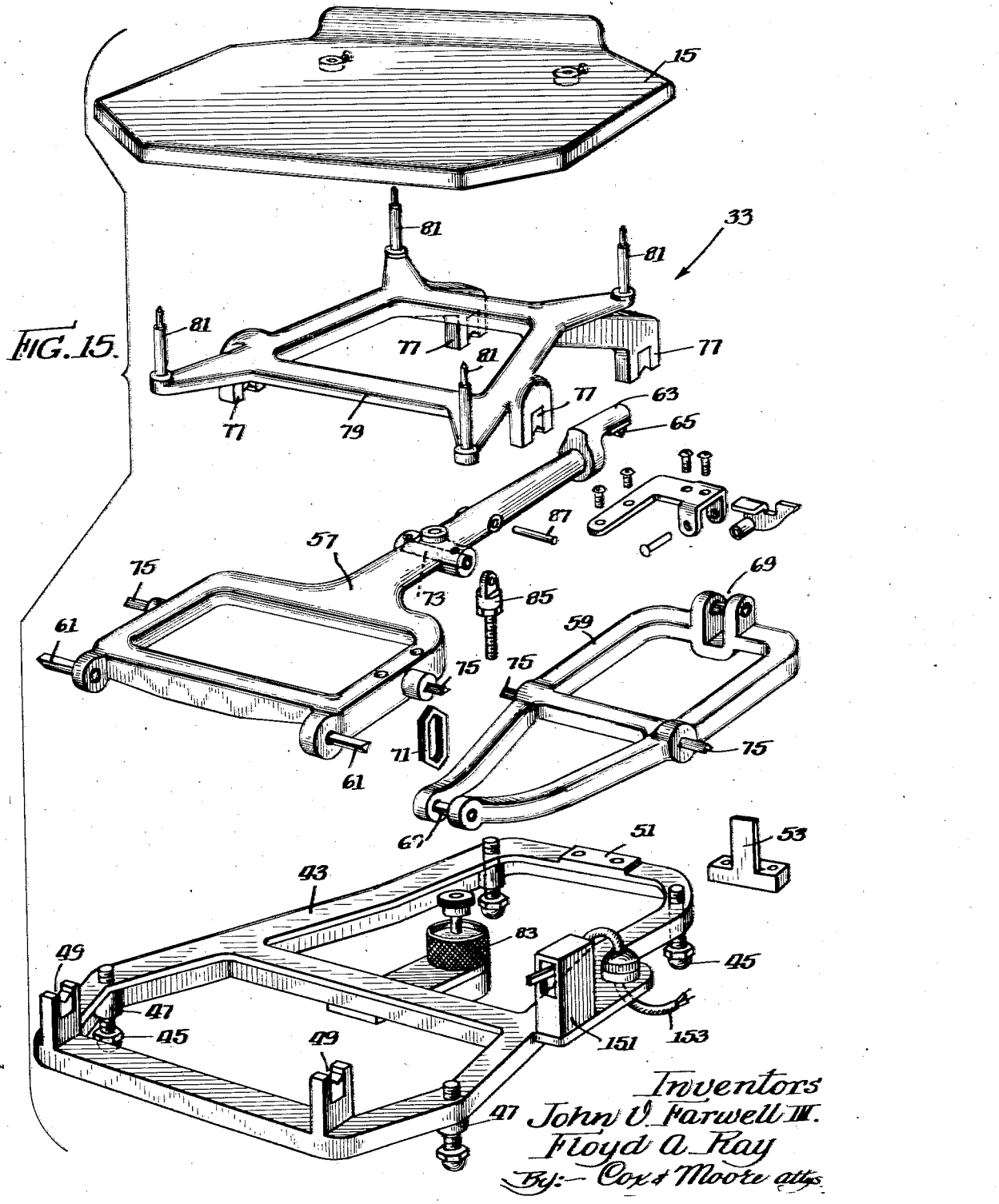

Patented Mar. 12, 1940

2,193,167

UNITED STATES PATENT OFFICE 2,193,167

WEIGHING SCALE

John V. Farwell, 3rd, Chicago, and Floyd A. Ray, Belvidere, Ill., assignors to Sanitary Scale Company, Belvidere, Ill., a corporation of Illinois Application October 22, 1937, Serial No. 170,428

6 Claims. (Cl. 265—69)

This invention relates in general to weighing mechanism and has more particular reference to an improved computing scale.

An important object of the invention is to provide a scale mechanism embodying a resilient weighing element including a means to compensate for the effect of temperature change upon the weighing mechanism.

Another important object is to utilize a self-compensating spring as the resilient weighing mechanism whereby to avoid the necessity of employing thermostatically actuated mechanical adjustment of the scale mechanism in order to compensate for the effect of temperature change upon the resilient weighing element.

Another important object resides in novel means for illuminating the indicating dial of a weighing scale including an arrangement of lamps in position to directly illuminate the scale dial, a further object being to brightly illuminate localized areas of the dial.

Another important object resides in utilizing the dial illuminating lamps for lighting an advertising or display sign mounted in the weighing scale.

Another important object resides in arranging the dial for display through a window opening and to provide at the opening eye-arresting means to direct the eye of an observer rapidly to a desired one of a number of measuring scales on the dial.

Another important object is to provide a temperature compensated weighing mechanism embodying interconnected weighing levers without resort to mechanically adjusted levers under the influence of a thermostat, thereby simplifying the lever construction and permitting a lever damping dashpot to be arranged centrally and conveniently in the system, thereby applying the damping effect to the lever system without tilting the same.

Another important object is to provide a weighing scale having a weighing element adapted to compensate for and eliminate the effect of hysteresis whereby the spring exerts substantially the same pull upon the weighing mechanism during the period of its expansion as it does during the period of spring contraction whereby calibration of the weighing mechanism is simplified to the extent that lever bearings and other mechanical connections need not be finished with extreme accuracy to insure the same indicated weight measurement regardless of the direction from which the measurement is made.

Weighing scales for precision weight measurement are required to indicate the same weight in response to the application of a given mass regardless of whether the mass is applied upon the scale in a manner to stretch the resilient weighing mechanism or whether the weight is applied by loading the scale with a greater weight and then removing a part of the weight to permit the resilient weighing mechanism to contract.

Hysteresis in a spring is that quality of lagging which causes the spring to exert a slightly greater tension when elongated to a predetermined point than the pull exerted by the spring when contracted to the same degree of extension. The hysteresis effect, in a precision mechanism, allows slight manufacturing inaccuracies, as in the bearings, pivots and other mechanical parts, to deleteriously affect the precision of measurement of the scale during contraction of the resilient weighing element as compared with the accuracy of measurements obtained during extension of the element. By eliminating the hysteresis effect, the scale is made to measure weight accurately, regardless of the direction of movement of the weighing mechanism toward the measuring position, without, however, requiring extreme manufacturing precision in the bearings, pivots and other mechanical working parts of the system. The invention, in short, visualizes simplification due to the elimination of extreme care in finishing the bearings and pivots and of calibrating and recalibrating the scale in order to obtain accuracy of weight indication during contraction as well as expansion of the weighing element.

These and numerous other objects, advantages, inherent functions and utilities of the invention will become apparent as the same is more fully understood from the following description, which, when taken with the accompanying drawings, discloses a preferred embodiment of the invention.

Referring to the drawings.

Figure 1:
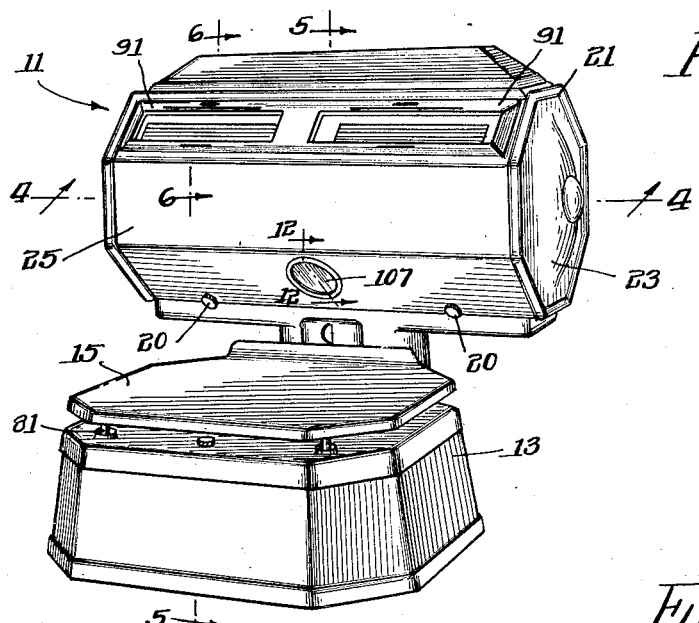
Figure 1 is a perspective view of a weighing scale embodying the present invention, the view being taken from the front right aspect.
Figure 2:
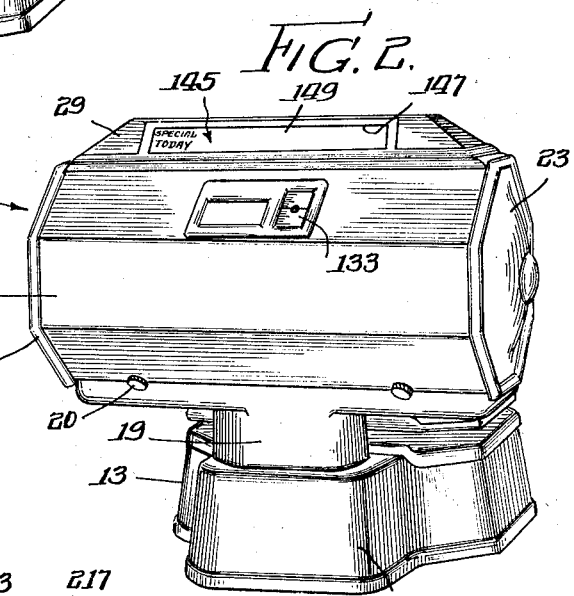
Figure 2 is a perspective rear view of the scale shown in Figure 1.

Figures 4, 5 and 6 are sectional views taken substantially and respectively along the lines 4—4, 5—5 and 6—6 in Figure 1;

Figure 7 is an enlarged sectional view taken substantially along the line 7—7 in Figure 14 to illustrate the manner of anchoring one end of a resilient weighing element forming a part of the weighing mechanism;

Figure 8 is a perspective view of a mounting for the resilient weighing mechanism;

Figure 9 is a perspective view of the upper portions of the scale, parts of the scale housing being removed to reveal the internal construction;

Figures 10, 11, 12 and 13 are enlarged views illustrating details of the scale;

Figure 14 is a sectional view taken substantially along the line 14—14 in Figure 5;

Figure 15 is an exploded view showing, in perspective, the several parts comprising the interconnected lever system forming a part of the scale.

To illustrate the invention the drawings show a precision weighing mechanism comprising a computing scale 11 of the type commonly employed in retail stores where merchandise is sold by weight. To this end the mechanism is enclosed in a sightly housing which comprises a base 13 above which is disposed a weight receiving platform 15. The base 13 has an extension 17 rearwardly of the platform 15, on which extension is mounted an upstanding hollow pedestal 19, upon the upper ends of which is erected a dial case 21 preferably elongated in a direction laterally with respect to the platform 15, and it will be noted that the pedestal 19 is of relatively restricted height so that the dial housing 21 extends in position only slightly above the platform 15. The base 13, including the extension 17 and the pedestal 19 may be formed as an integral casting or in any suitable or convenient manner. The dial casing 21, however, is preferably built up of sheet metal parts including end walls 23 and longitudinal walls 25 extending between and secured in any suitable or convenient fashion on the end walls 23.

These end walls 23 are preferably formed with opposite ends adapted to fit within marginal flanges on the front and rear sides of the end walls, the lower edges of the walls 23 being secured on the pedestal 19 by fastening screws 20. The top of the dial housing 21, as shown more particularly in Figures 6 and 9, comprises a substantially flat plate 27 bridging the top of the casing 21 between the end walls 23 and secured thereto as at 24, said plate having dependent flanges 30 at its opposite edges to receive and secure the upper ends of the walls 25, as clearly shown in Figure 6, and a cover or cap element 29 which may conveniently be formed of sheet metal which is fastened on the plate 27 in position extending thereabove to form a chamber 31.

The weighing mechanism comprises a lever system 33, the several parts of which are illustrated in Figure 15, resilient weighing means comprising preferably helical springs 35 which are operatively connected with the lever system, and indicating means comprising a dial 37 and a pointer 41, one of which elements is mounted stationarily in the case and the other being rotatably mounted and drivingly connected with the lever system.

The lever system is mounted in a support frame 43 adapted to be secured within the base 13, said base being supported on and from the frame 43, which thus carries the entire weight of the weighing scale. The frame 43 is preferably provided with suitable feet 45 which may be in the form of bolts having heads adapted to form the feet and threaded stems adjustably mounted in embossments 47 formed on the frame 43. The frame at one end has a pair of spaced bearings 49 on opposite sides of the frame and at the other end the frame is formed with a seat 51 adapted to receive a pedestal 53 carrying swinging bearing 55. The lever system comprises interconnected lever elements 57 and 59 both of which are fulcrumed on the frame 43, one lever 57 having knives 61 formed at one end thereof in position to engage the bearings 49, said lever extending from the bearings, which are in the forward portions of the casing toward the rear of the casing, the lever having a nose 63 extending beneath the hollow pedestal 19 and carrying a knife 65 fixed thereon. The lever 59 is formed with a knife edge at one end as at 67 for suspension in the swinging bearing 55 and the opposite end of the lever 59 is formed with a knife edge element 69 adapted to rest in a stirrup 71, the upper end of which is hung upon a knife edge 73 formed in the lever 57 between the fulcrum and nose ends thereof. Both levers 57 and 59 are provided with supports 75 in position to receive inverted bearings 77 formed on a platform supporting frame 79 which carries upwardly extending supports 81 which pass through filleted openings 83 formed in the top of the frame 13 in position to engage the underside of and support the weight receiving platform 15.

The frame 43 carries a dashpot 83 disposed centrally therein beneath the lever 57 adjacent the link carrying knife element 73, and a connection 85 is provided for attaching the dashpot to a pin 87 which is supported in the lever 57 along the central axis for the purpose of damping the movement of the lever system under the influence of a weight applied on the platform for measurement.

The indicator preferably comprises a cylindrical scale carrying or dial element 37 which is preferably rotatably mounted in the dial housing 21 by means of pivots 89 formed in the end members 23. The dial is preferably arranged as a plurality of sections visible through windows 91 formed in the upper front wall of the dial housing. Each section contains a plurality of weight indicating scales, there being, in the illustrated embodiment, a weight indicating scale 93 graduated in pounds and fractions thereof and a plurality of weight scales 95 graduated in terms of monetary value. Adjacent scales 95 in one scale section preferably vary by a differential of a unit of monetary value, while the adjacent scales 95 in the other scale section vary by a multiple of the monetary unit employed, which unit in the illustrated device is one cent. The weight scale 93 preferably is arranged in the scale section containing the one-cent graduations 95. One of the scale sections also preferably contains an inverted weight scale 97 for a purpose to be hereinafter more fully described.

Within the housing 21 and preferably behind the windows 91 is mounted a support bar 99 which preferably is secured to and extends between the end members 23. This bar 99 contains lugs 101. Between the lugs 101 a preferably wire filament is stretched whereby to constitute a stationary pointer 41, and in order to provide a desired tautness in the said wire the same may be severed at its approximate mid-portion and the severed ends connected together by means of a tensioning spring 103. The bar 99 also carries a template 105 for display in and opposite each of the window openings 91, said templates 105 each having a central opening to reveal a limited portion of the scale carrying surface of the dial sections behind the indicator wire 41. The forwardly facing surfaces of the templates may contain indicia indicating the character of the scales appearing in the template openings opposite the said indicia. The lower front wall of the casing 21 is formed with a window 107 facing outwardly toward the platform 15, and the bar 99 preferably carries a bracket 109 on which is mounted an electric lamp socket 111 in position to carry a lamp 113 within the casing 21 opposite the window 107.

The top or cover 29 is removable from the plate 27, being held in place by means of the clips 115, said cover 29, when in place, having curled edges 117 fitting into grooves formed adjacent the margin of the plate 27. The cover 29 encloses lamps 119 which are mounted in lamp sockets 121 which in turn are secured on the plate 27 by suitable brackets 123. The brackets 123 are mounted substantially midway between the opposite ends of the plate 27 so that the lamps extend between said brackets and the ends of the plate. The plate also is formed with elongated openings 125 adjacent the forward edge of the plate 27 so that light from the lamps may penetrate through the plate and impinge upon the upper forward surfaces of the dial sections and illuminate the area revealed through the openings in the templates 105.

To increase the intensity of illumination of the indicator portions at the areas exposed through the windows, we may employ light transmitting means for applying concentrated beams of light at desired areas in the indicator. Such light transmitting means may conveniently comprise material offering low resistance to light transmission therethrough. The material is preferably arranged in rod, strip or sheet form and mounted in the scale assembly with an end or edge of the rod, strip or sheet element in position preferably closely abutting the light source to cause light from the source to enter the element. The opposite end of the light transmitting element may be arranged in position adjacent the indicator portions to be illuminated. The surfaces of the light transmitting element preferably are smooth and polished whereby to utilize the reflecting power of the said surfaces to the utmost in preventing the light, introduced at one end of the element, from dispersing laterally from the element even though the light may impinge upon the lateral surfaces of the element at appreciable inclinations.

The intermediate portions of the transmitting element may be curved in any suitable or convenient manner for mounting in the available space in the scale assembly, provided the element is not bent at any place so sharply as to permit light rays traveling the element to impinge upon the surfaces thereof at an angle of incidence allowing the light to escape laterally.

Light rays may thus be retained in the transmitting element until it reaches the delivery end or edge thereof disposed adjacent the surface to be illuminated, which edge the light may strike at an angle of approximately 90° and be permitted to escape onto the surface toward which the end of the transmitting element is directed.

It is desirable to mount the light transmitting element in holders or clamps and to avoid fasteners penetrating the body of the element and also to avoid marring the external surfaces of the element since both impair the light transmitting efficiency of the element.

We do not herein claim the broad idea of light transmitting means, per se, in combination in a weighing scale since the same comprises the invention of Floyd A. Ray forming the substance of a separate patent application.

To apply the foregoing features in the scale assembly shown in the drawings, the plate 27 is slotted preferably parallel to and adjacent the openings 125 for the reception of plates 127 of light transmitting material which, conveniently and preferably, may comprise molded material such as "Lucite," a material manufactured by E. I. du Pont de Nemours Company, of Wilmington, Delaware. Quartz, glass and other materials having the desired light transmitting characteristics may alternately be used. The light transmitting plates 127 have upper edges 129 facing toward the lamps 119, the plates being curved, if necessary, to face the edges to the lamps in position to directly receive light rays upon the edges 129. Light so impinging upon the edges 129 is transferred through the plates and is delivered in substantially undiminished quantity at the opposite edges of the plates. These opposite edges are preferably disposed closely adjacent the scale carrying surfaces of the dial sections immediately behind the templates so that the dial areas exposed through said templates are brightly illuminated to increase the visibility of the scales through the windows 91 and the template openings. As shown in Figure 11, the plates 127 are supported in brackets 131 which in turn are fastened on the plate 27.

The wall 25 defining the rear of the casing 21 has an opening 133 which is arranged preferably in the upper portions of the wall 25 substantially opposite the inverted scale 97 to reveal the same therethrough, the scale being inverted so that it may be properly oriented for convenient reading through the opening 133 on the back of the casing. This inverted scale, then, is the customer's scale, while the scales appearing in the windows 91 are for the use of the person operating the scale. In order to illuminate the customer's scale opposite the window 133 the plate 127 may be formed with a perforation 135 to permit light from one of the lamps 119 to shine upon the scale. In order to intensify the illumination of the scale in localized areas opposite the window 133 a rod 137 of material similar to that comprising the plate 127 may be arranged in position extending through an opening 139 formed in the plate 127, one end 141 of the rod being bent for abutment against the lamp 119, while the opposite end of the rod is disposed adjacent the dial surface which is visible through the window 133. The rod may be conveniently supported on the plate 27 by means of the bracket 143.

It will thus be seen that the lamps 119 serve to illuminate the scale carrying portions of the dial in order to render the same readily visible through the window openings 91 and 133.

The lamps 119 serve the additional purpose of illuminating a display sign 145 which is exposed in a window opening 147 formed in the wall of the cap 29 immediately above the customer's window 133. The window opening 147 carries a translucent removable plate 149 of preferably frosted material on which the owner or operator of the scale may write an advertising message which may be changed from time to time. The message is preferably written on the element 149 in any suitable relatively dark or opaque pigment so that illumination of the panel 149 by means of the lamps 119 renders the advertising message highly visible to a customer facing the back of the scale mechanism.

The frame 43 which supports the lever system 33 carries an electrical switch 151 thereon in position to cooperate with the system of interconnected levers so that the movement of the levers under the influence of a weight applied on the platform 15 may serve to close the switch 151 as soon as any weight whatever is applied on the platform. The switch 151 is interconnected by means 153 with an external source of electrical power and also with the lamps 113 and 119 so that the same may be energized to perform each its dial and sign or platform illuminating function as heretofore described.

As heretofore mentioned, the lever mechanism 33 is suspended on the resilient weighing means 35 which preferably comprises helical springs anchored on the frame and on which springs the lever system 33 is suspended so that a weight applied on the platform is counterbalanced by the springs which extend and permit the lever system to move in proportion to the amount of the weight applied on the platform. To this end the resilient weighing elements 35 are preferably arranged in the dial casing 21 and are connected with the lever system at the nose 63 of the lever 57 by means of an adjustable connection 155 which extends through the hollow pedestal 19 which supports the dial casing 21 from the base 13.

The resilient weighing means 35 preferably comprises a pair of spring elements 157 and 159 of preferably identically matched construction. The elements 157 and 159 each comprise a pair of interconnected preferably helically arranged spring sections, the upper section 161 being anchored at its upper end by means of an adjustable fitting 163 upon the frame 165 which in turn is supported on seats 167 formed internally in the hollow pedestal 19, as clearly shown in Figures 5 and 14. The frame 165 comprises a pair of spaced uprights 169 which are laterally offset as at 171 (Fig. 5) to accommodate the axle of the dial, the uprights being formed with feet which may be secured on the supports 167 in any suitable fashion and preferably by means of bolts as shown. The uprights 169 extend within the space between the adjacent dial sections, as shown in Figure 4, and are interconnected at their upper ends by rods 173 which may be formed integrally with the uprights 169 to maintain the same in spaced relationship and to afford an anchorage for the upper ends of the springs 157 and 159, there being preferably at least two spacing rods 173, one for supporting each spring, so that the springs 157 and 159 may extend on opposite sides of the dial axle with the axes of the springs supported substantially both equally distant from said axle.

Each rod 173 is provided with a spring supporting member 175 comprising a threaded stem mounted in the arm 173 and secured by a clamping nut 177. The member 175 depends from the rod 173 and terminates in the hook 179 on which the mounting element 163 is suspended. This mounting element 163 has a slot 181 for receiving the uppermost turn of the upper spring section 161, which turn is secured in the slot 181 by means of the fastening element 183. This arrangement permits the suspended length of the upper spring section to be accurately determined by adjusting the point on the spring which is clamped in the support 163. The lower end of the spring section 161 is formed with a hook 185 to receive the upper hooked end 187 of the lower spring section 189. The lower end of the section 189 is also formed preferably with a hook 191 for receiving the upper hooked end of the connecting rod 193, the lower end of which is likewise hooked upon an ear 195 of the tilting frame 197. The frame 197 is formed with two spaced ears 195 for suspending the same upon both springs. The spacement of the ears 195 is preferably substantially equal to the spacement of the anchorage bars 173 at the upper end of the frame 165 so that both of the springs 157 and 159 are maintained in approximate parallelism at all times. The frame 197 carries a pivoted suspension member 199 which is pivoted to the frame on an axis midway between the ears 195 so that the force transmitted to the springs through the member 199 will be applied substantially equally on each spring element. The lower end of the member 199 carries an adjusting member 201, the same comprising a threaded nut rotatable on the member 199 and having threaded connection with the upper end of the stem 203, said stem having a shoulder, and a spring 205 being arranged between the shoulder and the lower end of the adjusting member 201 in order to eliminate backlash. The stem 203 at its lower end carries a stirrup 207 which in turn supports a knife edge bearing 209 facing upwardly in the stirrup. The stirrup also defines an opening above said bearing 209 and through which opening the nose 63 of the lever 57 may be assembled in position such that the fixed knife edge 65 on said nose may rest in and bear upon the bearing 209. The stirrup opening is made large enough to permit the nose, including the knife edge 65, to be inserted into the opening over the bearing and the stirrup carries a locking element 211 pivoted thereon and swingable to a position uncovering the stirrup opening to permit assembly of the nose 63 as aforesaid. After the knife edge 65 is seated in the bearing 209, however, the member 211 may be released and by gravity or otherwise returned to a position partially covering the stirrup opening and adapted to retain the nose 63 in a position preventing the escape of the knife edge from the bearing 209.

The dial 37 also is drivingly connected with the lever system through the frame 197, as shown in Figure 5. When a weight is applied on the platform 15 the interconnected levers are disposed, which movement is transmitted through the nose 63 and stirrup 207 to cause extension of the resilient weighing elements 35 through the spring connected frame 197, which likewise moves outwardly in the hollow pedestal 19 under the influence of the weight on the platform 15. The downward movement of the frame 197 is applied to the rack 213 which is guided vertically between the uprights 169 in position to engage a pinion 215 which is mounted on the axle of the rotatable dial member 37. The movement thus imparted in the lever system is of course proportional to the weight applied on the platform 15 because of the operation of the resilient weighing means 35. Consequently the movement of the rack 213, the pinion 215 and the indicating dial is also proportional to the weight applied on the platform for measurement, and this weight consequently may be indicated on the dial opposite the index element or pointer 41 either as weight on the scales 93 and 97 or in monetary equivalents on the several scales 95.

Figure 3:
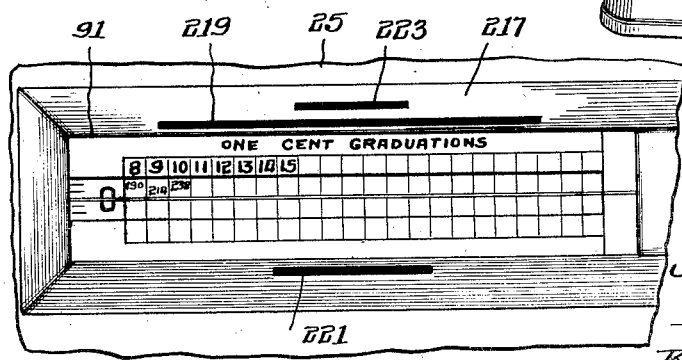
Figure 3 is an enlarged view of a window through which the indicating dial of the scale may be viewed.

It will be noted that the price scales 95 are necessarily small and arranged closely together for the sake of maximum compactness in the indicator. These price scales 95 are all displayed through the openings in the templates 105 which carry indicia indicating the unit price represented by each scale. In reading a weight indication on weighing apparatus of this character where a multiplicity of measuring scales are displayed in closely adjacent relationship in a narrow window, the operator of the scale often experiences difficulty in immediately locating the scale on which a reading is desired. This difficulty may perhaps best be described as "hunting" since it comprises the tendency of the observer to wander back and forth throughout the extent of the template in search of the desired scale. In order to minimize "hunting," the scale of the present invention employs eye-arresting means 217 substantially as indicated in Figure 3 of the drawings, said means comprising in the illustrated embodiment horizontal lines extending along the upper and lower edges of the window openings 91. These lines include a relatively long line 219 centered immediately above and adjacent the upper edge of the opening 91, a shorter line 221 likewise centered with respect to the window and extending along an adjacent edge of the lower opening 91, and a still shorter line 223 likewise centered with respect to the window and extending above and adjacent the long line 219. The lines 219, 221 and 223 may be formed in any suitable or preferred color contrasting with the external coloration of the casing at the window openings 91, and the line arrangement serves to attract the eye of the observer initially to the central portions of the scale section being observed, from which point the eye travels almost immediately and without faltering to the desired scale, thus eliminating the difficulty heretofore described as "hunting."

The spring sections 161 and 189 are formed of strips of spring material having a rectangular sectional configuration, as clearly illustrated in Figure 7. These springs are preferably formed of an alloy of iron with nickel, chromium and other elements, including copper, vanadium, manganese, silicon and molybdenum, in carefully selected proportions providing a spring material having compensating elastic characteristics when subjected to variable temperatures. The spring material also shows negligible hysteresis and will deliver the same tension when extended to the same degree regardless of whether such extended position is reached by expansion or contraction of the spring. The invention, however, is not necessarily restricted to the particular alloy employed as a spring material since numerous constant spring property alloys may be utilized to obtain the desired hysteresis elimination and constant elastic properties.

By thus eliminating temperature variation in the springs, the necessity of applying mechanical means for adjusting the lever system is obviated and lever adjusting thermostats are eliminated from the construction, thus considerably simplifying the same. Such thermostatic means of necessity has been applied centrally in the lever system. By eliminating the centrally located thermostatic lever adjusting means for temperature compensation, it is possible to connect the dashpot 83 centrally on the lever 57, thereby applying the damping effect of the dashpot centrally on the lever system in order to avoid inaccuracies due to an eccentric application of the damping force.

By eliminating the effects of hysteresis in the springs, extreme care in forming and aligning the bearings and knife edges is eliminated. Of course in a precision mechanism the bearings and operating connections between the lever system and the resilient weighing elements and with the indicating means necessarily require accuracy in the fabrication thereof. It is also desirable to reduce frictional resistance at the bearings and in all moving connections, including indicator pivots 89 as well as the indicator driving means, namely, the rack and pinion, but the necessity of eliminating the effect of friction in the moving parts is minimized to such an extent by the elimination of spring hysteresis effects that a weighing scale made in accordance with the teachings of the present invention does not require finishing and refinishing of the bearings, pivots and other moving parts, but commercial accuracy is obtained with the finish derived from the ordinary careful manufacturing precision. In short, the present invention eliminates the necessity and expense of applying a hand finishing operation to each of the bearings and other moving parts and thus allows the scale to be fabricated and assembled in a condition of commercial accuracy. Thus the invention eliminates the necessity of disassembling the scale in order to refinish the working parts to obtain commercial accuracy after the scale has been originally assembled and tested as is necessary with precision scale constructions heretofore provided.

The manufacturing advantages deriving from the present invention are of considerable value since the expense of disassembling and hand-finishing the various parts of the apparatus in order to obtain commercial accuracy is, in most cases, equal to the cost of assembling and testing the scale in the first instance, and the elimination of this expense is the paramount advantage of the present invention.

It is thought that the invention and its numerous attendant advantages, objects and inherent functions will be understood from the foregoing description, and it is obvious that various changes may be made in the form, construction and arrangement of the several parts of the illustrated apparatus without departing from the spirit or scope of the invention or sacrificing any of its attendant advantages, the preferred form herein described being merely for the purpose of illustrating the invention.

Having thus described our invention, what we claim as new and desire to secure by Letters Patent of the United States is:

1. A precision weighing scale comprising means forming a lower enclosing housing adapted to rest upon a platform, said housing having a relatively short tubular casing relatively restricted in cross sectional area extending upwardly therefrom, a relatively large indicator drum casing disposed upon said tubular casing, said drum casing upstanding from said tubular casing and being closed by dustproof wall means in all directions except at its connection to said tubular casing to provide a dead air space operative to prevent flue action of dust-laden air into said drum casing from said lower casing through the tubular casing under the influence of relatively elevated temperatures in said casings, certain of the walls of said drum casing having transparent windows therein permitting observation of indicia within the drum casing, said lower housing means having a lever weighing system enclosed therein, said lever system being interassociated and fulcrumed at relatively fixed permanent points on said levers, and a platform operating upon the lever system, a relatively large indicating drum turnably mounted in said casing and carrying indicia thereon, spring means mounted in the drum casing and having operative connections passing through said tubular casing and including depending knife edge means located in said lever housing, a complementary knife edge mounted at a predetermined fixed point in the length of the lever means and located immediately beneath said tubular casing and heat liberating illuminating means enclosed in said drum casing and mounted relatively close to said spring means and said drum, said spring means having inherent elastically compensating thermal characteristics continuously operable to correct elastically for temperature variations imposed within the casing whereby the performance of the scale remains substantially constant irrespective of the heat effect of said illuminating means and whereby the performance of the scale remains constant under varying conditions of temperature within the casing without the necessity of adjusting the knife edge with respect to said lever means.

2. A precision weighing scale comprising enclosing housing means including a lower, relatively large base housing adapted to rest upon a suitable supporting surface, a relatively large drum receiving casing disposed above said base housing and an upstanding, hollow pedestal member extending upwardly from said base housing and supporting the drum casing in vertically disposed relationship, said pedestal being relatively short and providing relatively restricted communication between said base housing and drum casing, said drum casing having continuous uninterrupted wall portions sealed against dust admission at all points spaced from said pedestal for effectively resisting flue action by heat generated within the casing, and maintaining the casing under dust excluding dead air conditions, a supporting frame in the base housing, and a weighing lever system fulcrumed on said frame, a weight receiving platform operatively associated with said lever system, said scale comprising an indicating drum rotatably disposed in said drum casing and bearing indicating indicia visible through transparent portions of the casing, heat generating lamp means for illuminating the scale, cooperatively disposed completely within said drum casing for illuminating said indicia, whereby liberated heat is retained within said casing and remote from said lever system, said scale including a thermally iso-elastic spring member operatively disposed completely within said drum casing in heat receiving relationship to said heat generating lamp members and continually operative to compensate for temperature variations imposed by said lamp means within the casing, and a spring responsive connecting member depending from said spring and extending through said pedestal housing to a point in said base housing relatively remote from said illuminated casing, and knife edge means on said connecting member within said base housing and engaging complementary knife edge means permanently located at a fixed point on said lever.

3. A precision weighing scale comprising an enclosing housing, means including a lower base housing adapted to rest upon a suitable supporting surface, a drum receiving casing disposed above said base housing and an upstanding hollow pedestal member extending upwardly from said base housing and supporting the drum casing in vertically spaced relationship, said pedestal being relatively short and providing restricted communication between said base housing and drum casing, said drum casing providing continuous wall portions sealed against dust admission from the exterior at all points removed from the pedestal for providing a dead air space adapted to exclude dust and effectively resist flue action under the influence of a relatively elevated temperature within said casing, a supporting frame in said base housing having a lever system fulcrumed thereon at a fixed point and a weight receiving platform operatively associated with said lever system, an indicating drum rotatably disposed in said drum casing and bearing indicating indicia visible through transparent portions of the casing, heat generating lamp means for illuminating the scale cooperatively disposed within said drum casing, said scale comprising weighing means within said housing and including a spring operatively disposed completely within said drum casing in heat receiving relationship to said heat generating lamp members, said spring having inherent elastically compensating thermal characteristics continuously operable to correct elastically for temperature variations imposed by said lamp means, within the casing, and a spring responsive connecting member depending from said spring and extending through said pedestal housing to a point in said base housing relatively remote from said illuminated casing, and knife edge means on said connecting member within said base housing and engaging complementary knife edge means permanently located at a fixed point on said lever.

4. A precision weighing scale, such as defined in claim 3, wherein said drum means comprises a pair of drum members extending laterally of the vertical axis of said pedestal and spaced to provide a spring receiving space axially therebetween, said spring receiving space being located substantially above the pedestal.

5. A precision weighing scale, such as defined in claim 3, wherein said drum means comprises a pair of drum members extending laterally of the vertical axis of said pedestal and spaced to provide a spring receiving space axially therebetween, said spring receiving space being located substantially above the pedestal, said lamp means being located in said space and in close adjacency to said spring means.

6. A precision weighing scale comprising an enclosing base housing, one end of said housing having a relatively short substantially centrally disposed upstanding hollow pedestal of restricted cross section, an enlarged upstanding indicator casing joined to the upper walls of said pedestal, said casing extending substantially transversely of the pedestal and being sealed against dust admission at all points removed from the hollow portion of the pedestal, lever means mounted in the base housing and having a weight receiving platform operatively associated therewith, said lever means including an elongated lever fulcrumed at a fixed point along its length and having one end directly beneath said pedestal, a shaft extending centrally and longitudinally of the transverse axis of said indicator casing, a pair of spaced drums mounted to turn about the center of said shaft as an axis, said drums having indicia on their surfaces, said indicator casing having windows through which said indicia are viewable, a pair of weighing springs suspended in said indicator casing in the space between and within the circumferential planes of said drums on opposite sides of said shaft, operating connections from the lower portion of said springs passing downwardly through said hollow pedestal and provided with suspension knife edge means, fixed knife edge means carried by that end of said elongated lever which underlies the hollow pedestal, said knife edge means being complementarily interengaged at a permanently fixed point on the length of the lever for rotating said drum upon movement of said operating connections, illuminating means having heat generating characteristics disposed in the space between said drums in heating relationship to the springs, said illuminating means being located substantially within the circumferential planes of said drums and lying relatively close to at least one of said spring means, said weighing springs having inherent, elastically compensating, thermal characteristics continuously operable to correct elastically for temperature variations imposed within the casing and responsive to the radiant energy of said adjacent illuminating means to maintain the performance of the scale substantially equal in spite of varying conditions of temperature.

JOHN V. FARWELL, 3RD.
FLOYD A. RAY.